US009067633B2

(12) United States Patent
Bell

(10) Patent No.: US 9,067,633 B2
(45) Date of Patent: Jun. 30, 2015

(54) BICYCLE CONVERTIBLE TO A STROLLER

(71) Applicant: Robert Bell, Guelph (CA)

(72) Inventor: Robert Bell, Guelph (CA)

( * ) Notice: Subject to any disclaimer, the term of this patent is extended or adjusted under 35 U.S.C. 154(b) by 0 days.

(21) Appl. No.: 13/916,085

(22) Filed: Jun. 12, 2013

(65) Prior Publication Data

US 2014/0367931 A1    Dec. 18, 2014

(51) Int. Cl.
*B62B 7/12*    (2006.01)
*B62K 7/00*    (2006.01)
*B62K 13/00*   (2006.01)
*B62K 7/04*    (2006.01)

(52) U.S. Cl.
CPC .. *B62K 13/00* (2013.01); *B62K 7/04* (2013.01)

(58) Field of Classification Search
CPC .............. B62H 7/00; B62H 1/10; B62H 1/12; B62K 13/00; B62K 13/04; B62K 13/06; B62K 13/08; B62K 7/00; B62B 7/12; B62B 7/126
USPC .................... 280/7.1, 7.15, 293, 295, 30, 643
See application file for complete search history.

(56) References Cited

U.S. PATENT DOCUMENTS

| 1,309,493 | A | * | 7/1919 | Tyler | 280/7.1 |
|---|---|---|---|---|---|
| 1,820,189 | A | * | 8/1931 | Hess | 280/293 |
| 1,820,190 | A | * | 8/1931 | Hess | 280/293 |
| RE18,424 | E | * | 4/1932 | Hess | 280/293 |
| 1,921,029 | A | * | 8/1933 | Hess | 280/293 |
| 2,011,402 | A | * | 8/1935 | Gallo | 280/7.1 |
| 2,220,528 | A | * | 11/1940 | Kutil | 280/7.15 |
| 2,541,952 | A | * | 2/1951 | Williams | 280/303 |
| 2,561,268 | A | * | 7/1951 | Dyksma | 280/301 |
| 2,591,534 | A | * | 4/1952 | Gallo et al. | 280/7.15 |
| 4,509,349 | A | * | 4/1985 | Partridge | 70/233 |
| 5,072,961 | A | * | 12/1991 | Huppe | 280/278 |
| 5,338,204 | A | * | 8/1994 | Herndon | 434/247 |
| 6,149,178 | A | * | 11/2000 | Bradbury et al. | 280/293 |
| 6,164,666 | A | * | 12/2000 | Prea | 280/7.15 |
| 6,331,012 | B1 | * | 12/2001 | Eisenmann et al. | 280/293 |
| 6,623,021 | B1 | * | 9/2003 | Nelson | 280/204 |
| 6,712,375 | B2 | * | 3/2004 | Chao | 280/287 |
| 6,918,606 | B2 | * | 7/2005 | Petrishe | 280/293 |
| 6,971,658 | B2 | * | 12/2005 | Chao | 280/278 |
| 6,994,368 | B2 | * | 2/2006 | Brown | 280/293 |
| 7,249,779 | B2 | * | 7/2007 | Ehrenreich et al. | 280/643 |
| 7,556,277 | B2 | * | 7/2009 | Lytle | 280/301 |
| 7,798,512 | B2 | * | 9/2010 | Kanou | 280/293 |
| 7,832,746 | B2 | * | 11/2010 | Peterson | 280/87.05 |
| 7,878,522 | B2 | * | 2/2011 | Liao | 280/282 |
| 7,992,889 | B2 | * | 8/2011 | Ehrenreich et al. | 280/648 |
| 2001/0035626 | A1 | * | 11/2001 | Kettler | 280/282 |
| 2003/0151225 | A1 | * | 8/2003 | Lopez | 280/282 |
| 2003/0230609 | A1 | * | 12/2003 | Chu | 224/423 |
| 2005/0043147 | A1 | * | 2/2005 | Huang | 482/57 |
| 2006/0175109 | A1 | * | 8/2006 | Cheng | 180/219 |

* cited by examiner

*Primary Examiner* — J. Allen Shriver, II
*Assistant Examiner* — Travis Coolman
(74) *Attorney, Agent, or Firm* — Walker & Jocke

(57) ABSTRACT

A bicycle convertible to a three-wheeled vehicle comprises a pair of auxiliary wheels mounted on either side of the rear wheel. The auxiliary wheels are movable between a raised position in which the auxiliary wheels are raised from the supporting surface when the bicycle is in a bicycle mode and a lowered position in which the auxiliary wheels contact the supporting surface when the bicycle is in a stroller mode. A locking mechanism is provided for locking the auxiliary wheels in the raised and lowered positions.

20 Claims, 14 Drawing Sheets

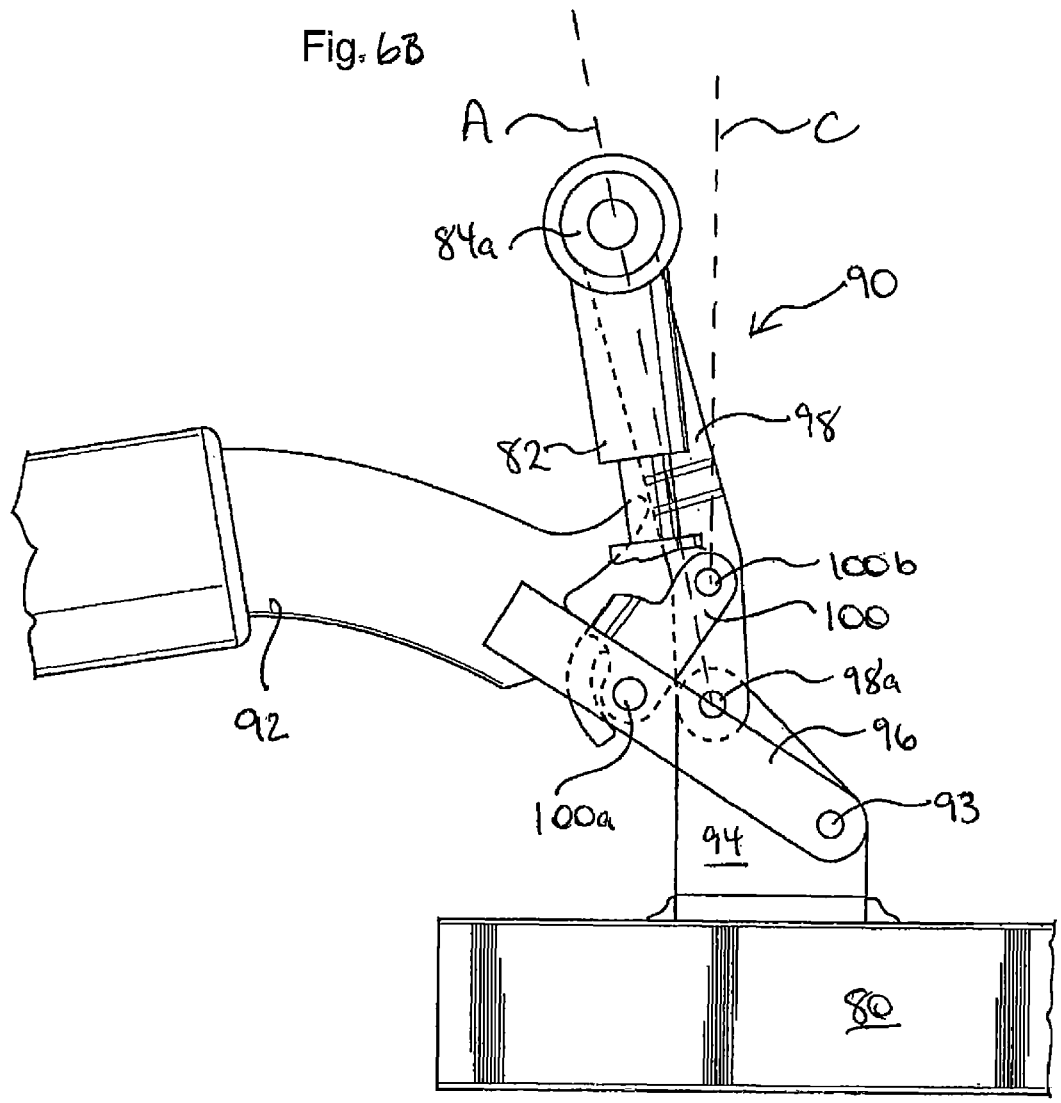

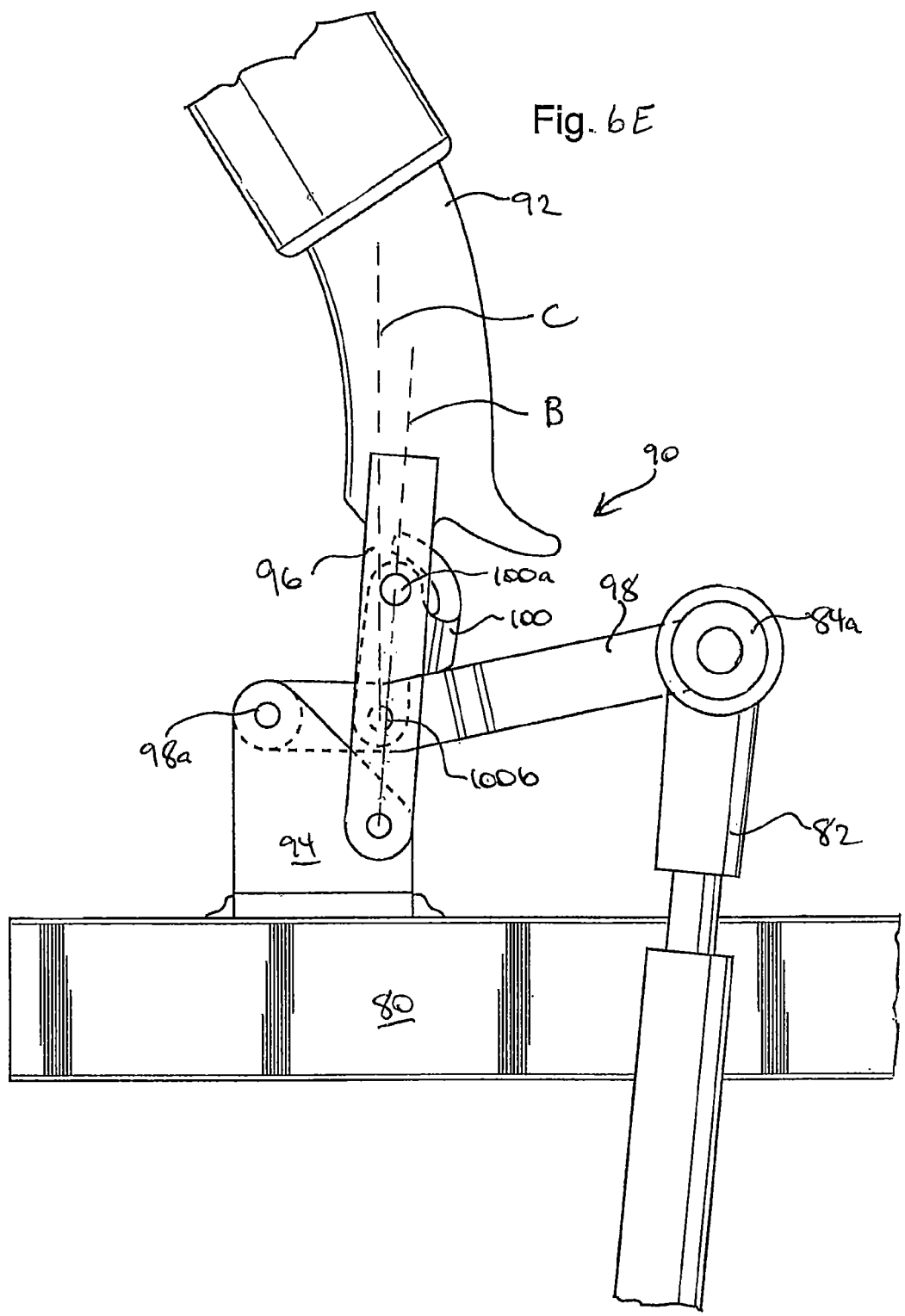

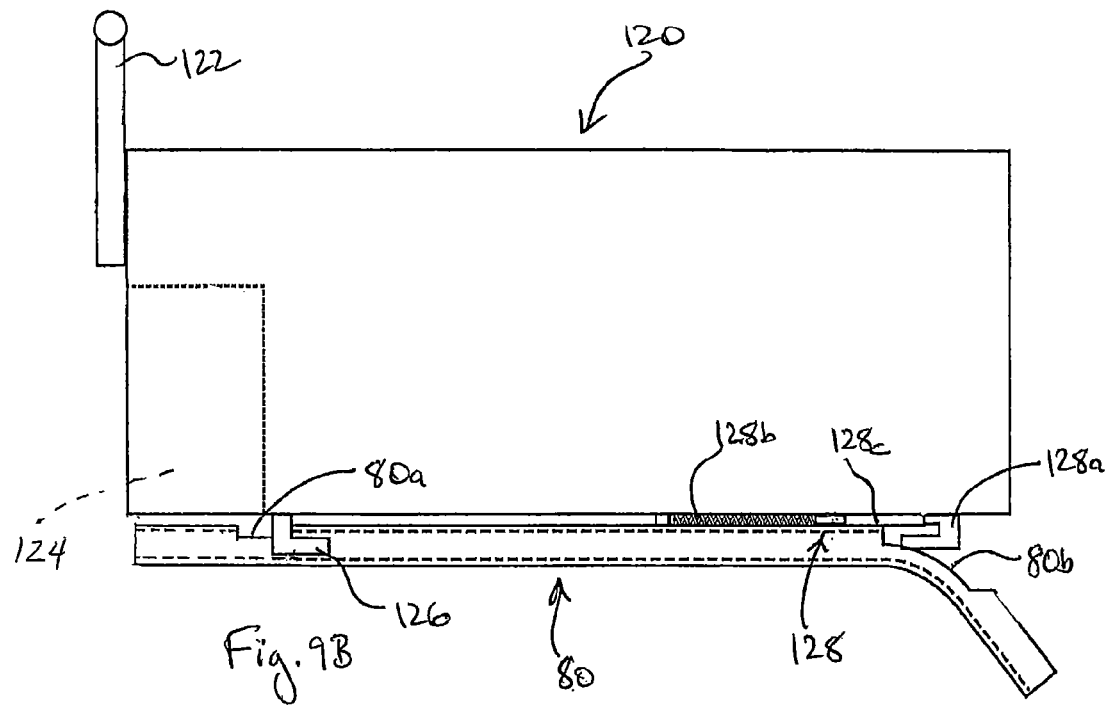
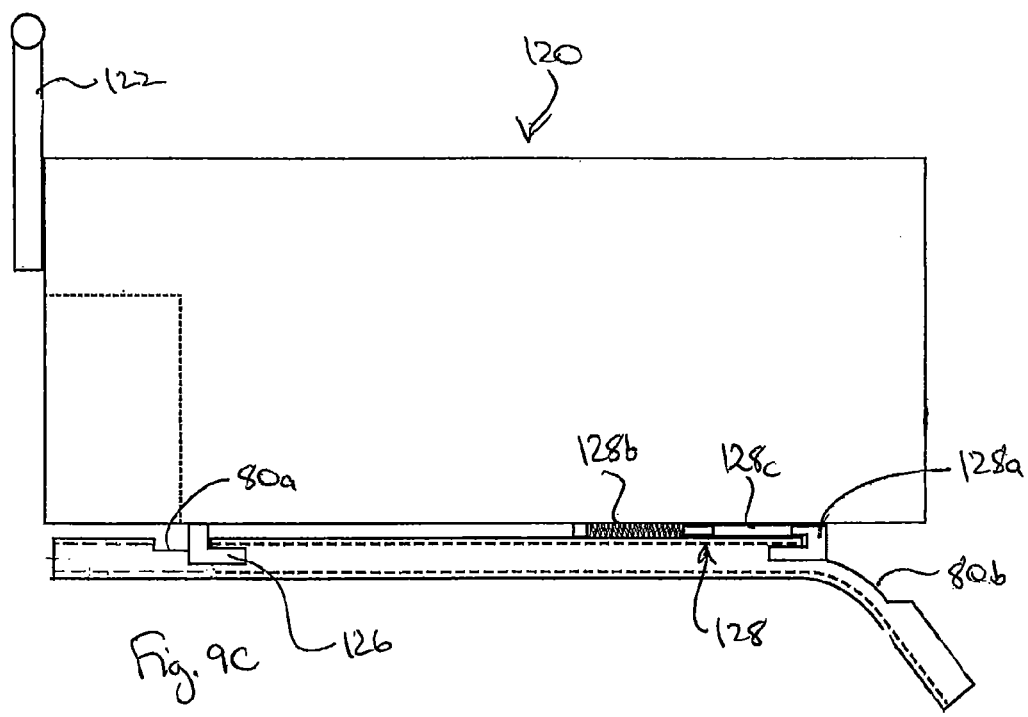

BICYCLE CONVERTIBLE TO A STROLLER

FIELD OF THE INVENTION

This invention relates to bicycles. In particular, this invention relates to a bicycle that can be converted to a stroller.

BACKGROUND OF THE INVENTION

Cycling is popular as a leisure and exercise activity, and as a means of travelling short and medium distances. A typical bicycle, as is well known, comprises a frame supporting a seat for the rider, mounted on front and rear wheels one of which is driven by a pair of pedals disposed generally within reach of the rider from the seat. The front wheel is rotatably mounted within the frame and a steering mechanism, typically a handlebar, is rotationally fixed to the front wheel, allowing the rider to turn, and to maintain balance while riding.

Because it has only two wheels a bicycle is vertically stable in the direction of travel, i.e. along a line between the two-point contact of the wheels to the ground, but unstable in a lateral direction perpendicular to the direction of travel. The rider maintains balance when in motion by constantly steering toward the center of gravity, to compensate for the lateral instability of the bicycle. In essence, when riding a bicycle the rider is always falling toward one side or the other, but stays upright by steering the bicycle toward the direction that the rider is falling at any particular moment. With a skilled rider this corrective process is imperceptible, but without this constant correction the bicycle would invariably fall over to one side. By itself the bicycle is incapable of maintaining lateral balance because it has only two-point contact with the ground.

Accordingly, a bicycle is not a feasible means of carrying children or goods unless a cyclist is actually riding it. If a cyclist is using a bicycle as a means of travelling with a child to a destination where the bicycle cannot used, for example to a supermarket to shop for groceries, once at the destination the bicycle becomes an impediment. It has to either be locked and left unattended, which risks theft and leaves the user without a means of carrying the goods or child, or 'walked' about the destination, which is awkward at best and not even an option in places such as many commercial premises where bicycles are not allowed.

It would therefore be advantageous to provide a bicycle that is capable of being converted between a bicycle mode and a stroller mode. The user can walk with a child and/or goods in the stroller mode, for example out of an apartment down to the street, convert the stroller to a bicycle and cycle to the destination with the child and/or goods in the carrier, and then at the destination covert the bicycle back to the stroller mode and enter the supermarket to shop for groceries with the bicycle in the stroller mode. The bicycle need never be left unattended, and in both the bicycle mode and the stroller mode provides a convenient way to carry goods and/or a child, while allowing the bicycle to be used as an environmentally friendly and efficient means of travelling to and from the destination.

BRIEF DESCRIPTION OF THE DRAWINGS

In drawings which illustrate by way of example only a preferred embodiment of the invention.

FIG. 6B is a side elevation of the wheel assembly actuator in the position of FIG. 6A.

FIG. 6E is a side elevation of the wheel assembly actuator locked in the stroller mode.

FIGS. 9A, 9B and 9C are side elevations of the carrier of FIG. 8 showing a means of locking the carrier to the carrier mounting bar.

DETAILED DESCRIPTION OF THE INVENTION

The invention provides a bicycle convertible to a three-wheeled vehicle, comprising front and rear wheels, a frame mounted on the front and rear wheels, the front wheel being rotationally mounted to the frame so as to be selectively rotatable to steer the bicycle in a bicycle mode or locked in a rotationally fixed position in the stroller mode, a drive mechanism for propelling the bicycle in a forward direction in the bicycle mode, a pair of auxiliary wheels, one auxiliary wheel being mounted to the frame on each side of the bicycle and movable between a raised position in which the auxiliary wheels are raised from the ground when the bicycle is in the bicycle mode and a lowered position in which the auxiliary wheels contact the ground when the bicycle is in the stroller mode, and a locking mechanism for locking the auxiliary wheels in the respective raised and lowered positions.

Figure 1:
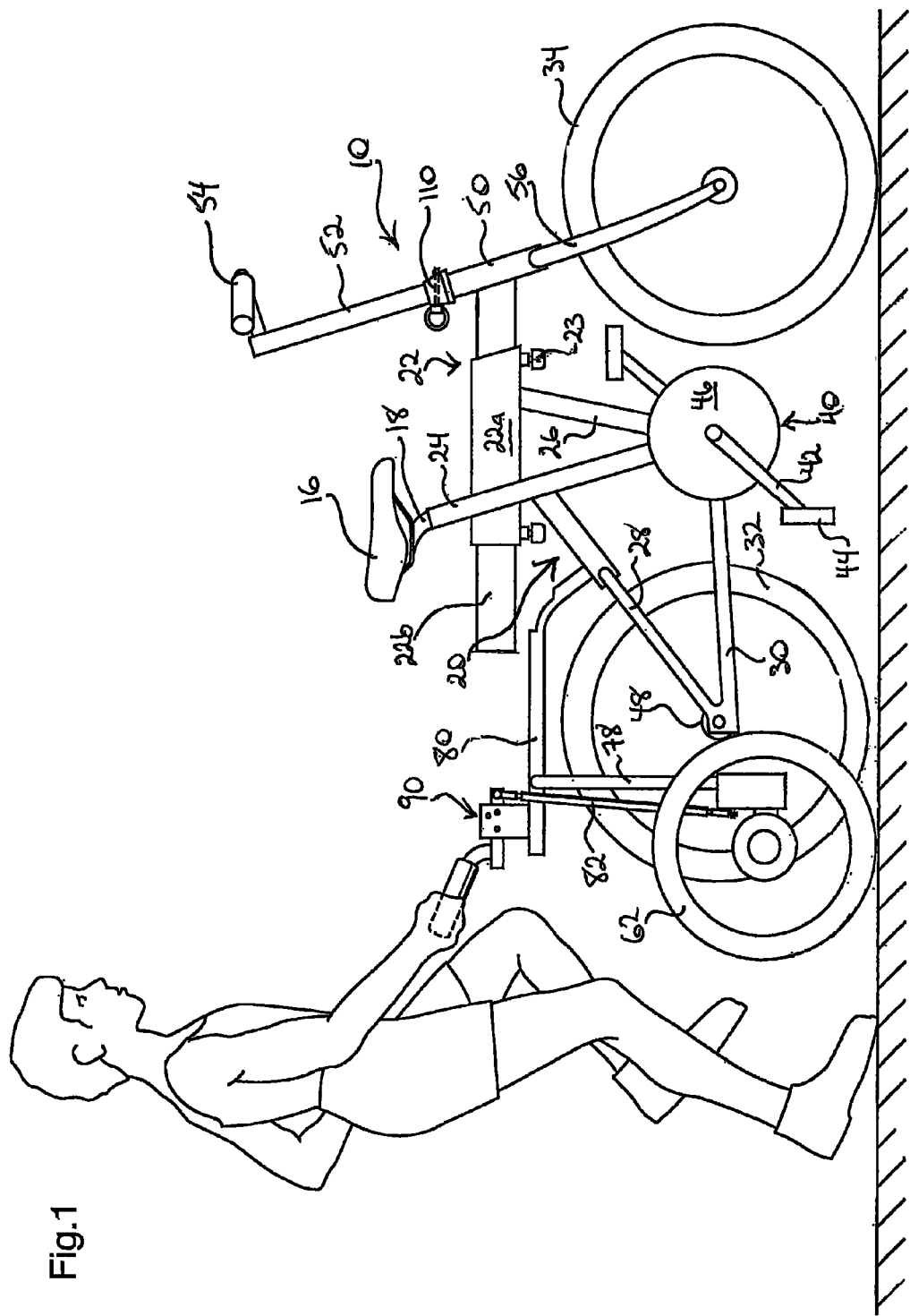
FIG. 1 is a schematic side elevation of an embodiment of the invention of the convertible bicycle in the stroller mode.

FIG. 1 illustrates an embodiment of a convertible bicycle 10 according to the invention. In the example illustrated a frame 20 comprises a top tube 22, a seat tube 24 and a down tube 26 forming a generally triangular frame section supporting the wheel drive mechanism 40. In the embodiment shown the drive mechanism 40 comprises a conventional foot pedal assembly comprising crank arms 42 terminating in foot pedals 44, rotationally fixed to a sprocket 46. Typically a saddle 16 is mounted to the seat tube 24 via a seat post 18.

The frame 20 further comprises a seat stay 28 and chain stay 30 which are supported on the rear wheel 32. In a typical bicycle the hub of the rear wheel 32 provides a sprocket 48 driven by the sprocket 40, typically via a chain (not shown) as is well known, to propel the bicycle 10 in a forward direction. The rear sprocket 48 may drive the rear wheel 32 in a conventional 'ratchet' fashion, rotationally engaging the wheel 32 in the forward direction but disengaging from the wheel 32 in the reverse direction. Thus, as the pedal assembly is rotated the sprocket 48 and rear wheel 32 rotate according to the gear ratio between the front and rear sprockets 46, 48, but if the cyclist stops rotating the pedal assembly the rear wheel 32 continues to rotate so as not to act against the momentum or impede the motion of the bicycle.

Many bicycles have multiple 'gears', for example providing a plurality of front and/or rear sprockets which can be selectively engaged by the cyclist to increase or decrease the gear ratio between the front and rear sprockets, and thus the amount of force required to drive the rear wheel 32, as is well known. The invention is equally well suited for these and other types of 'multiple speed' bicycles.

A head tube 50 is affixed to the top tube 22 at the front of the frame 20. The head tube 50 is oriented so that the handlebar stem 52 supporting handlebar 54 extends through the head tube 50 generally vertically, although typically at a slight forward angle. The handlebar stem 52 is rotationally retained within the head tube 50.

The handlebar stem 52 terminates in a front fork 56 which is rotationally fixed to the handlebar stem 52 and mounted on the front wheel 34. Thus, turning the handlebar 54 rotates the handlebar stem 52 ad the fork 56, which in turn rotates the front wheel 34 to steer the bicycle 10.

The components of the frame 20 may be formed from any material suitable for a bicycle, and affixed in any suitable fashion (for example in the case of metal components, welded). In the embodiment shown the top tube 22 comprises an outer tube 22a and an inner tube 22b slidably mounted in the outer tube 22a, and locked into a selected position by thumbscrews 23, for example (without limitation) the Giatex (trademark) OX stretch-frame bicycle by Giatex Cycle Co., Ltd. This is optional but advantageous, allowing the handlebar and front wheel assembly to be retracted toward the rear wheel 32 when the bicycle is in the stroller mode, as described in greater detail below.

Figure 2:
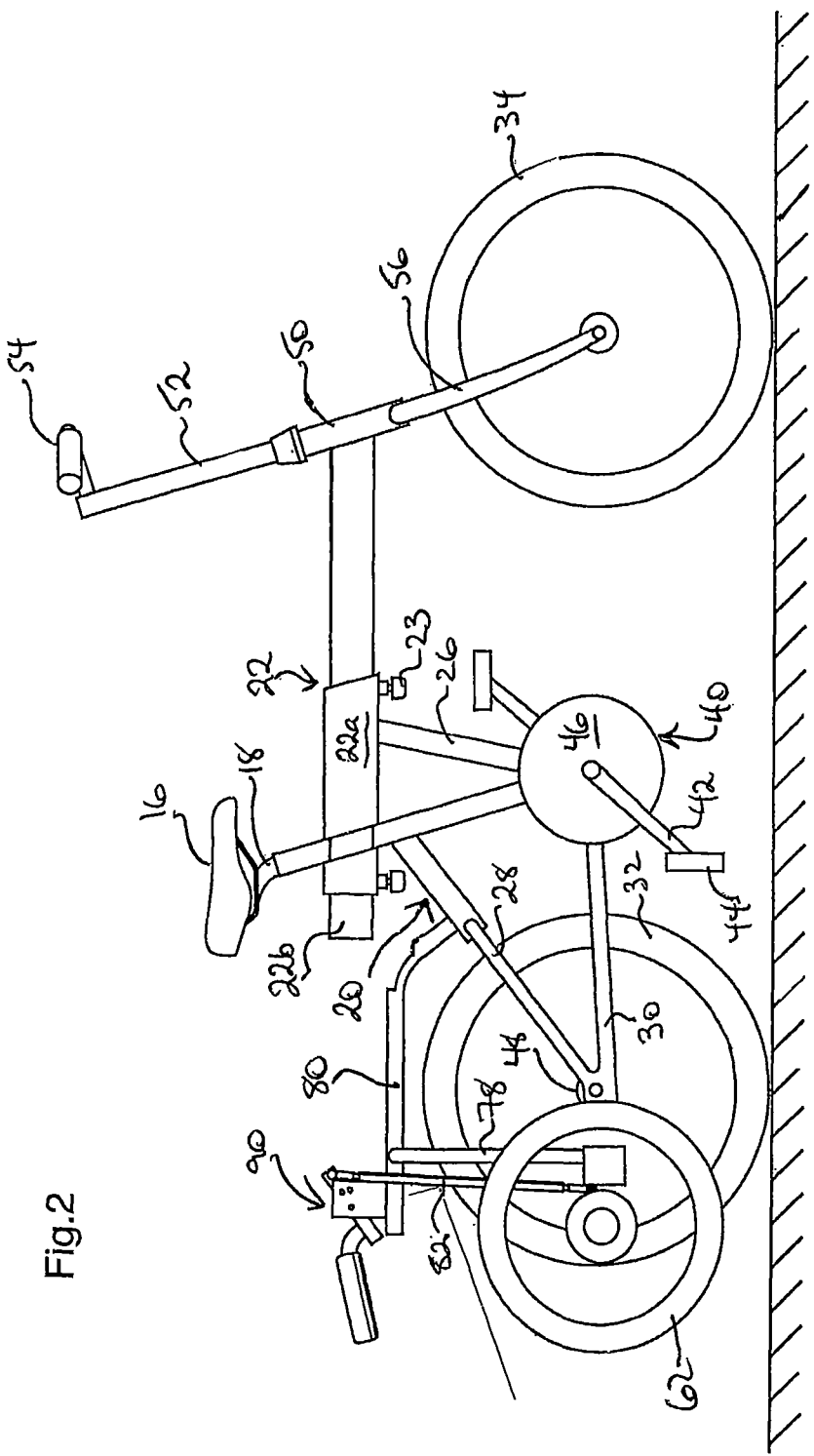
FIG. 2 is a schematic side elevation of the convertible bicycle in the bicycle mode.

According to the invention, an auxiliary wheel assembly 60 is provided, comprising a pair of auxiliary wheels 62 mounted to the frame 20 on either side of the rear wheel 32. The auxiliary wheels 62 may be conventional bicycle wheels, for example with a solid hub or hub-and-spoke construction, but may be smaller than the bicycle wheels 32, 34 to reduce the weight of the bicycle and the footprint of the bicycle 10 in the stroller mode. The auxiliary wheels 62 are movable between a raised position in which the auxiliary wheels 62 are raised from the supporting surface (e.g. the ground) when the bicycle 10 is in the bicycle mode, as shown in FIGS. 1 and 4, and a lowered position in which the auxiliary wheels contact the supporting surface when the bicycle is in the stroller mode, as shown in FIGS. 2 and 5.

Figure 3:
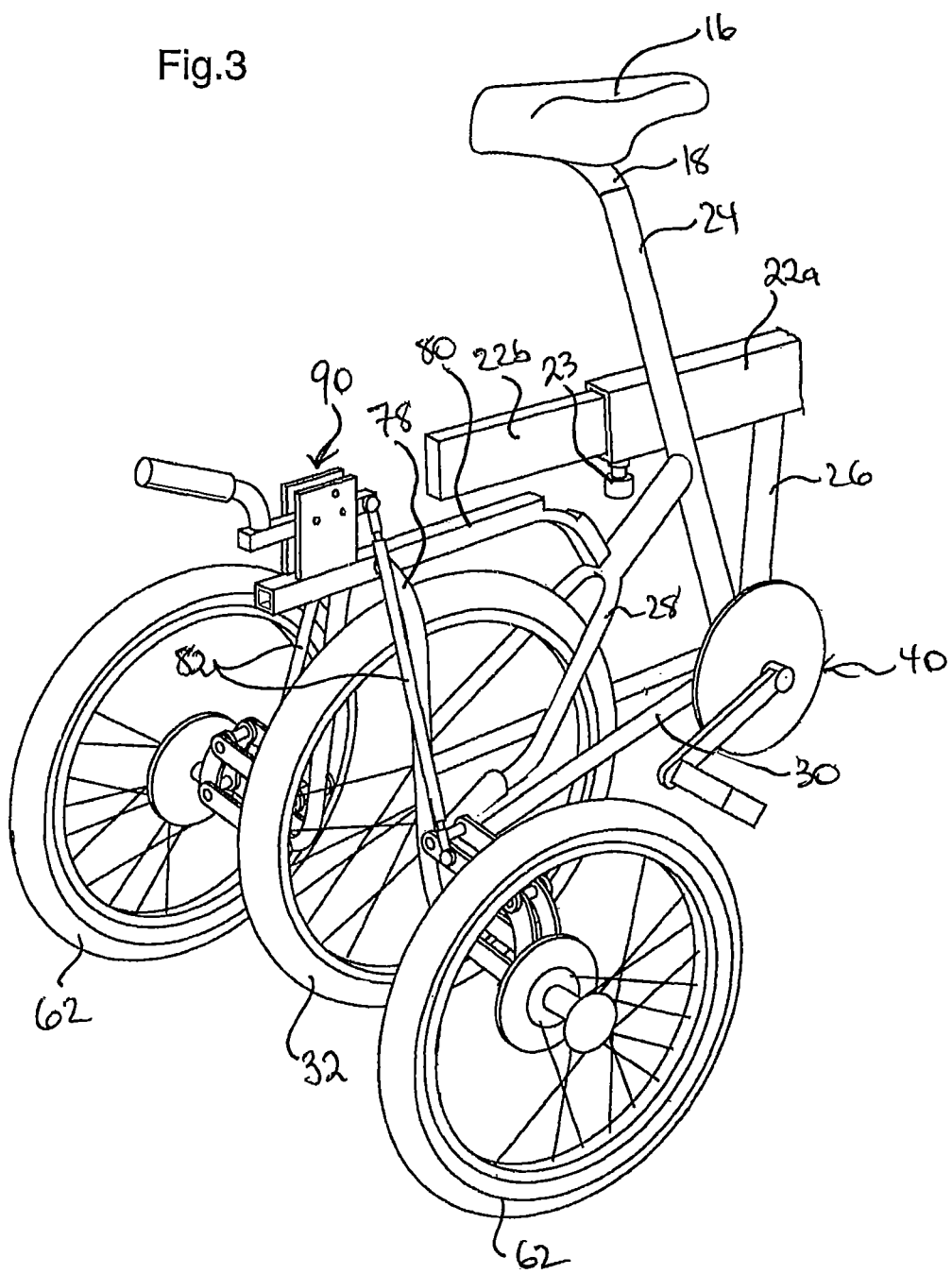
FIG. 3 is a partial schematic perspective view of the convertible bicycle of FIG. 1 showing the movable wheel assembly.
Figure 4:
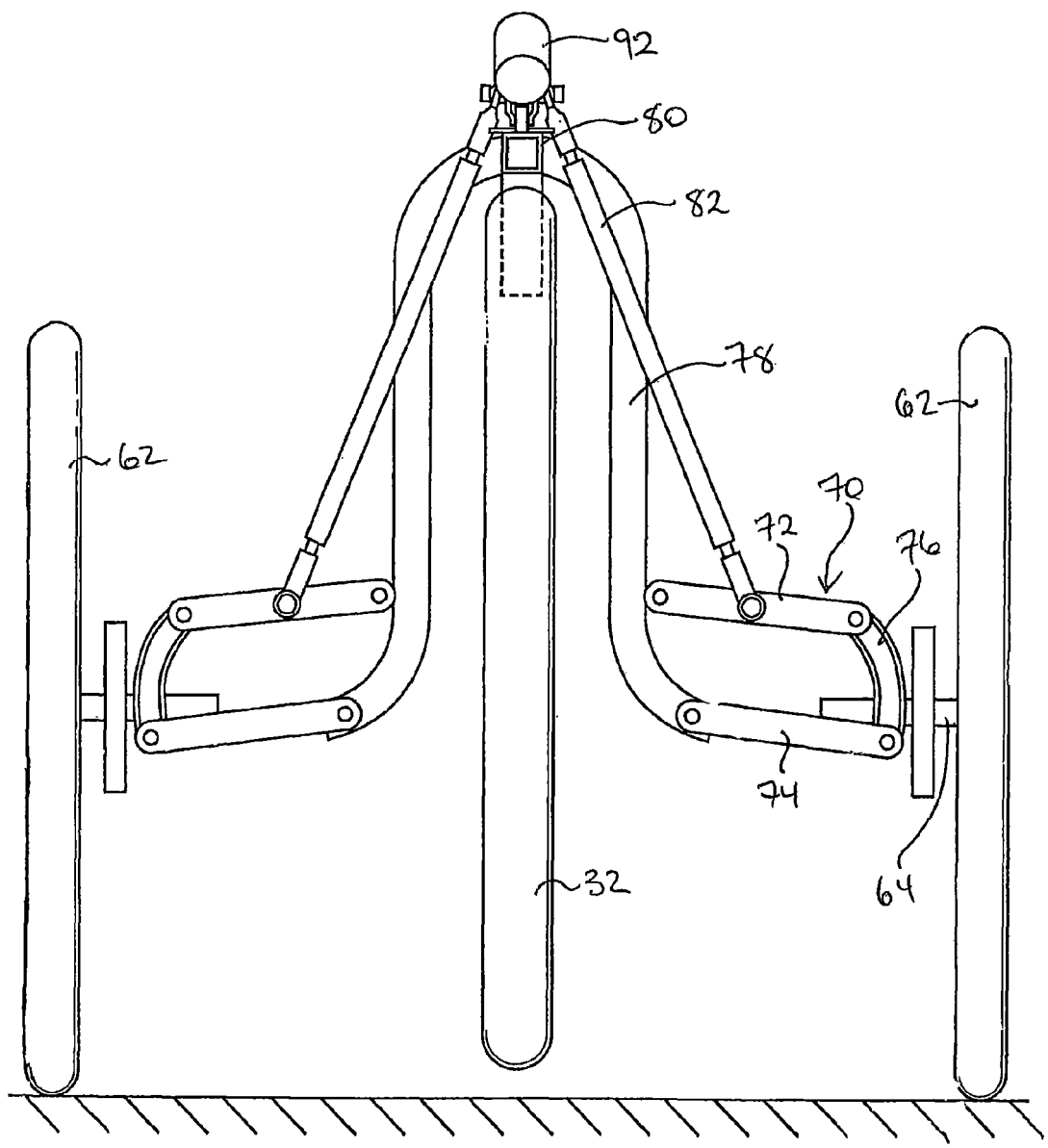
FIG. 4 is a schematic rear elevation of the portion of the bicycle shown in FIG. 3 with the wheel assembly in the stroller mode.
Figure 5:
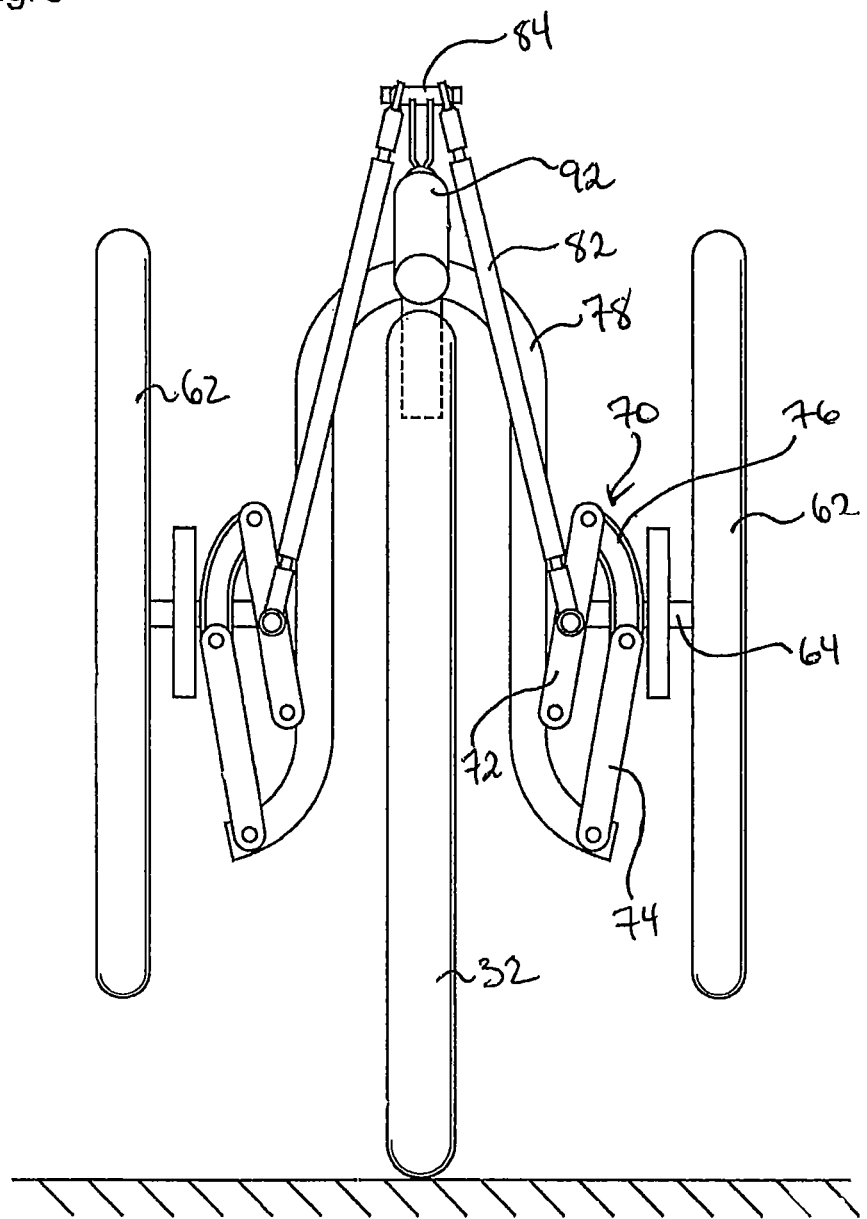
FIG. 5 is a schematic rear elevation of the portion of the bicycle shown in FIG. 3 with the wheel assembly in the bicycle mode.

As best seen in FIGS. 3 to 5, in the embodiment illustrated the auxiliary wheels 62 are each mounted on a wheel support arm 70, comprising pairs of upper and lower bridging bars 72, 74 each pivotally secured at one end to a fixed wheel support bar 78 and at the other end to a pair of axle mounts 76. The axle 64 of the auxiliary wheel 62 is mounted (for example welded) between the pair of axle mounts 76, and the wheel 62 in turn is rotatably mounted to the axle 64 and secured against dislodgement in any suitable fashion. It will be appreciated that the auxiliary wheel support arms 70 could be formed from a single bridging arm, however the auxiliary wheels 62 would tilt outwardly as the wheels 62 are raised and the single bridging bar follows an arcuate motion around its pivotal attachment to the wheel support 78. The embodiment illustrated is preferred for both its strength, since the wheel support arm 70 must bear a significant portion of the weight of the bicycle 10 plus any load carried on the bicycle 10, and because two bridging arms 72, 74 articulated in the manner shown maintain the auxiliary wheels 62 in a plane generally parallel to the plane of the rear wheel 32, thus minimizing the width of the bicycle 10 in the bicycle mode, as can be seen in FIG. 5.

The wheel support bar 78 in the embodiment illustrated is formed as a harp, supported at its apex by an auxiliary wheel frame support 80 which in turn is secured to any suitable portion of the frame 20. In the embodiment illustrated the auxiliary wheel frame support 80 is welded or otherwise securely fixed to the seat stay 28 and projects rearwardly, generally above the rear wheel 32. The wheel frame support 80 must be strong enough to support the auxiliary wheel assembly in the raised position, and also to support the rear of the bicycle 10 and any load carried by the bicycle 10 in the stroller mode.

Affixed to the wheel frame support 80 is an auxiliary wheel actuating mechanism 90 for raising and lowering the auxiliary wheels 62, and for selectively locking the auxiliary wheels 62 in the raised and lowered positions, respectively for the bicycle and stroller modes. As best seen in FIGS. 4 and 5, a pair of lifting rods 82 is provided to selectively lift and lower the auxiliary wheel assembly 60 during conversion between the bicycle and stroller modes. The lifting rods 82 are joined at their upper ends by a rod bridge 84 to which each lifting rod 82 is pivotally secured, for example through opening 84a. The lower end of each lifting rod is pivotally secured to its associated auxiliary wheel support arm 70 supporting the respective auxiliary wheel 62 on that side of the bicycle 10.

In the embodiment shown the auxiliary wheel actuating mechanism 90 comprises a double-locking over-center toggle bar linkage, illustrated in detail in FIGS. 6A to 6F. The auxiliary wheel actuating mechanism 90 is actuated by a handle 92 comprising a hand grip 92a pivotally secured to a base bracket 94 by a pair of handle arms 96 at handle pivot 93. The base bracket 94 is affixed (for example welded) to any suitable portion of the frame 20, in the embodiment illustrated to the wheel frame support 80.

One end of a lifting rod linkage 98 is pivotally secured to the base bracket 94 at base bracket pivot 98a, and the other end of the lifting rod linkage 98 is affixed (for example welded) to the rod bridge 84. Thus, as the lifting rod linkage 98 is pivoted about the base bracket pivot 98a, lifting rods 82 lift or lower their associated auxiliary wheel support arms 70, to in turn raise or lower the respective wheel 62 on each articulating arm 70. It will be appreciated that this arrangement works as long as the lifting rod linkage 98 is pivotable relative to the lifting rods 82. Therefore, the lifting rods 82 could instead be welded to the rod bridge 84 or formed with the rod bridge 84 as a single piece, and the rod bridge 84 rotatably mounted to the lifting rod linkage 98.

The handle 92 is articulated to the lifting rod linkage 98 to effect both raising and lowering the wheels 62, and locking the wheel actuating mechanism 90, in the following manner.

A handle arm linkage 100 joining the handle arms 96 to the lifting arm 98 at an intermediate point between the hand grip 92a and the handle pivot 93. One end of the handle arm linkage 100 is pivotally secured to the handle arms 96, for example at handle arm pivots 100a, and the other end of the handle arm linkage 100 is pivotally secured to the lifting rod linkage 98, for example at lifting rod linkage pivots 100b disposed at an intermediate point between the base bracket pivot 98a and the rod bridge 84. Thus, pivoting the handle 92 about handle pivot 93 forces the lifting rod linkage 98 to pivot about base bracket pivot 98a. The particular placement of the pivot points is selected to provide a desired leverage.

Figure 6A:
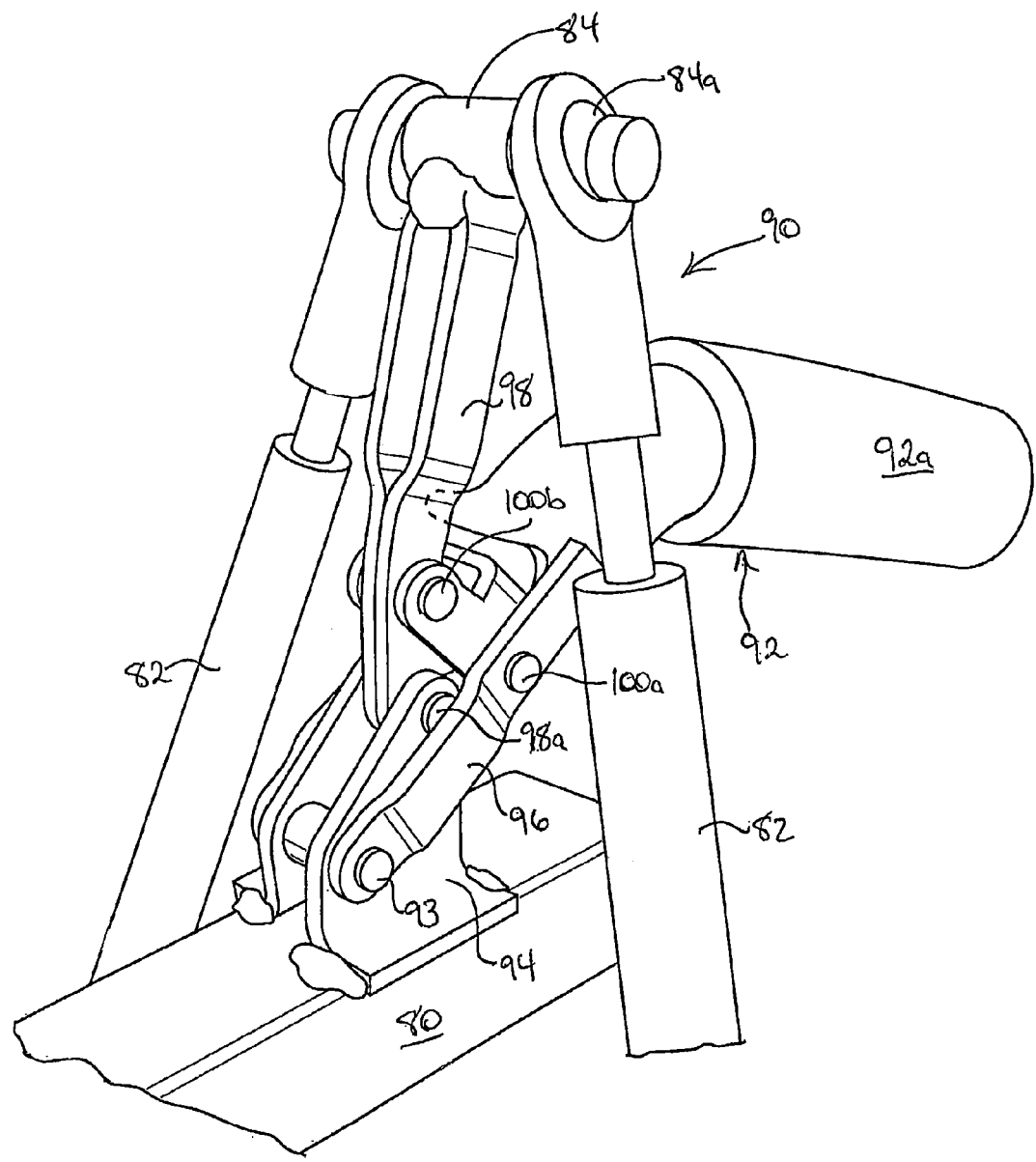
FIG. 6A is a perspective view of the wheel assembly actuator locked in the bicycle mode.

The lengths of the lifting rod linkage 98 and handle arm linkage 100 are selected to provide the double locking action of the auxiliary wheel actuating mechanism 90. As the auxiliary wheel actuating mechanism 90 is moved into the bicycle mode position illustrated in FIGS. 6A and 6B, the longitudinal axis (represented by phantom line A in FIG. 6B) of lifting rod linkage 98 crosses the toggle centre line (represented by phantom line C in FIG. 6B), until the handle arm linkage 100 rests on the top of the base bracket 94, as best seen in FIG. 6B. Thus, the rod bridge 84 passes top dead centre in order to reach the bicycle mode locking point. Since in that position the lifting rods 82 would have to rise in order for the lifting rod linkage 98 to pass back over the centre line, the weight of the auxiliary wheel assembly 60 retains the auxiliary wheel actuating mechanism 90 locked in the bicycle position.

Figure 6C:
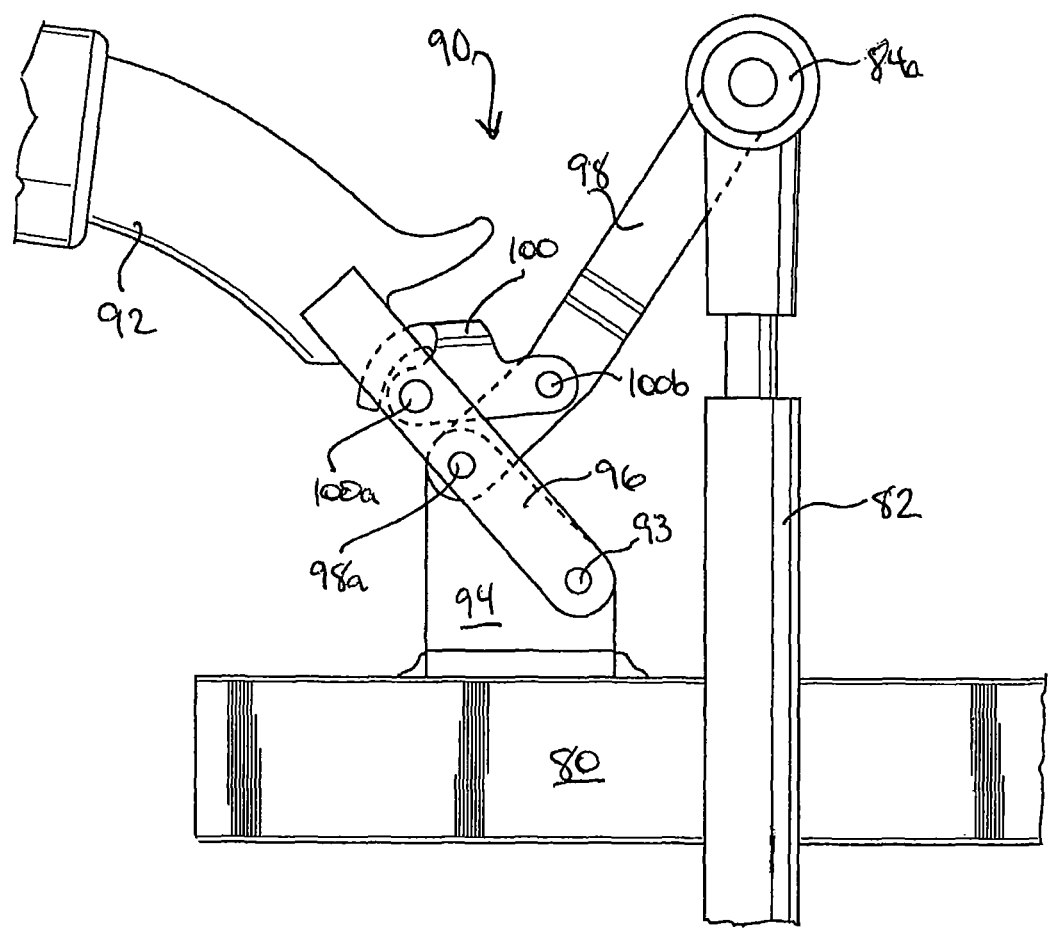
FIG. 6C is a side elevation of the wheel assembly actuator in a first intermediate position moving from the bicycle mode to the stroller mode.
Figure 6D:
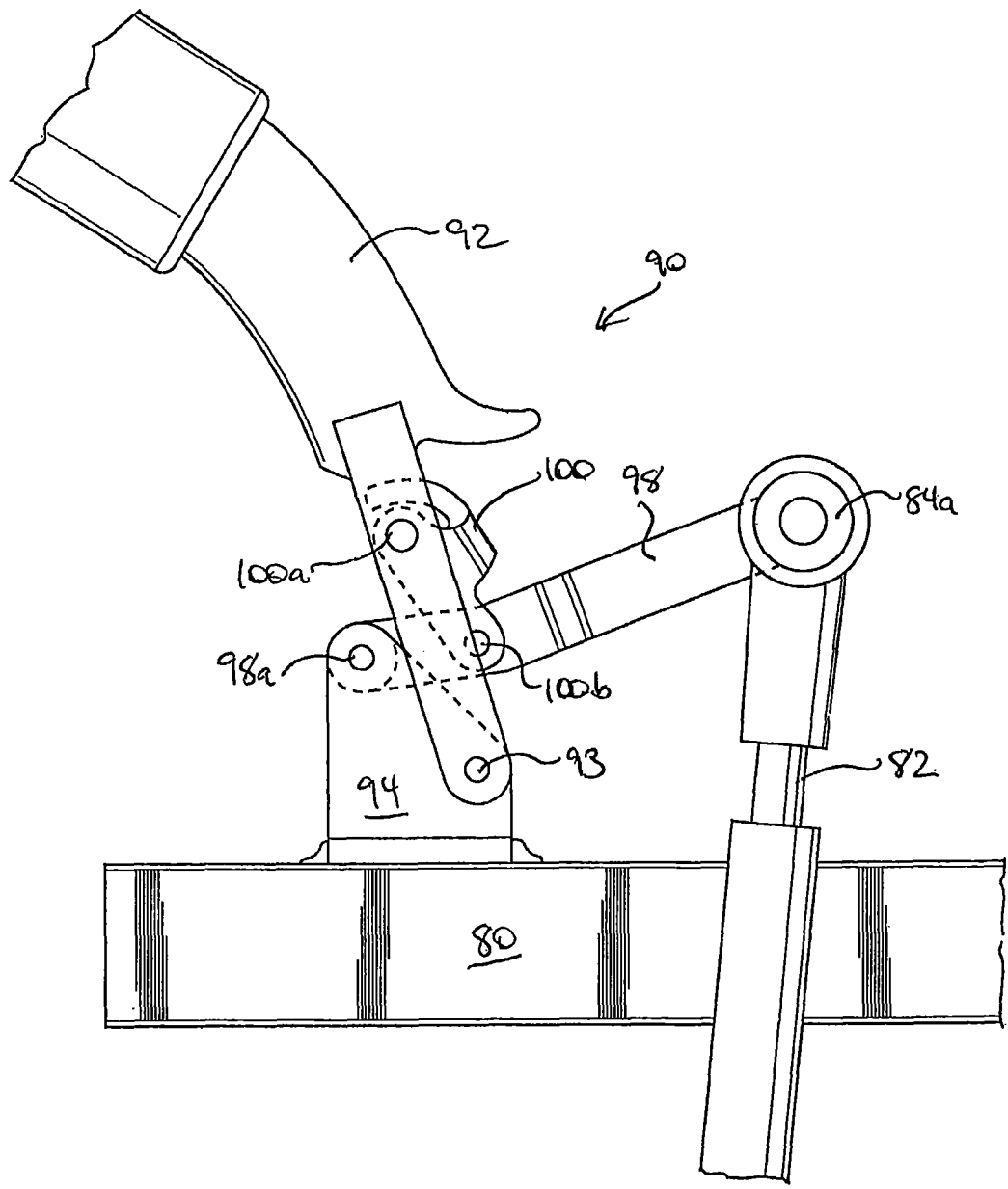
FIG. 6D is a side elevation of the wheel assembly actuator in a second intermediate position moving from the bicycle mode to the stroller mode.
Figure 6F:
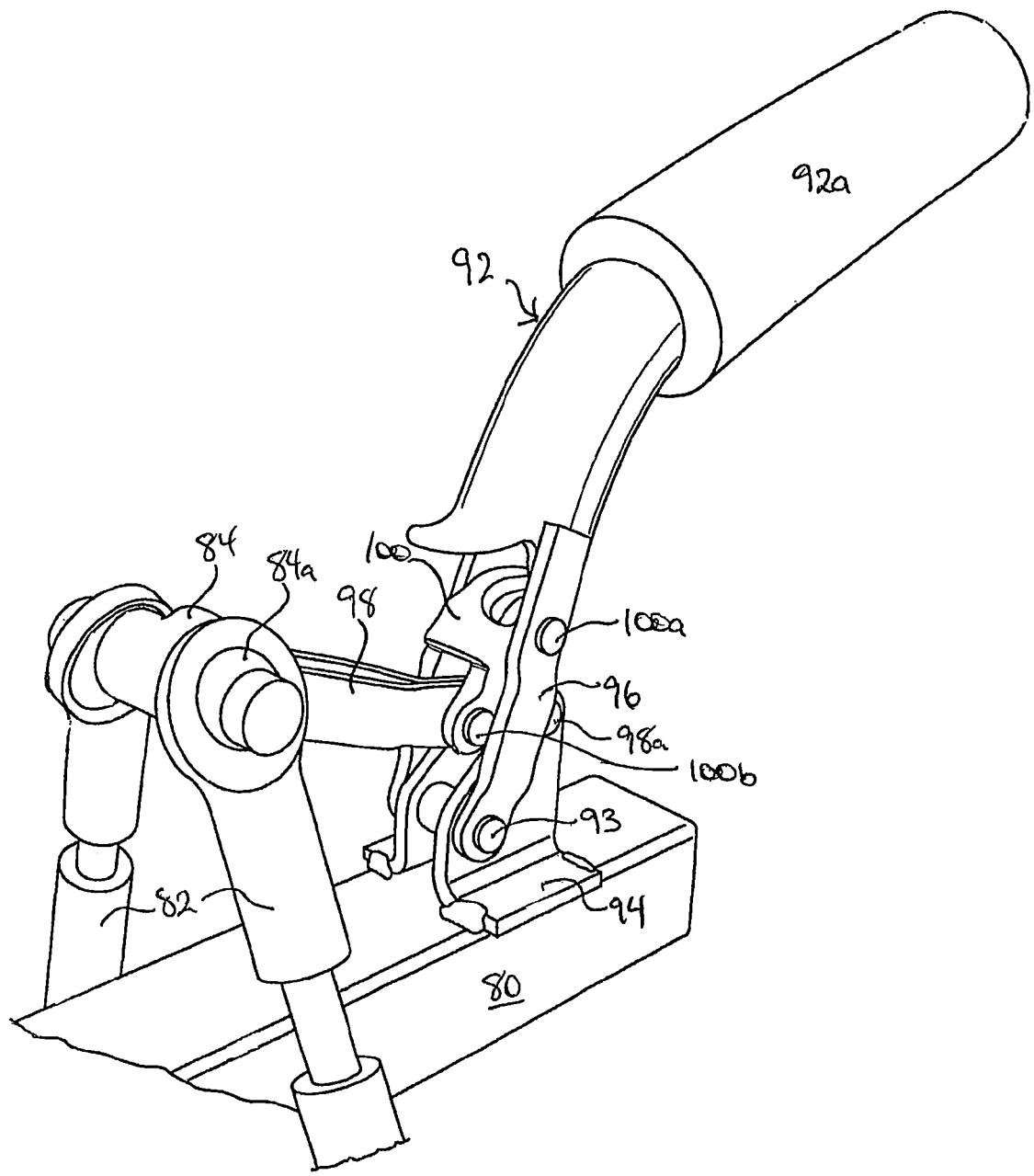
FIG. 6F is a perspective view of the wheel assembly actuator in the position of FIG. 6D.

To move the auxiliary wheel actuating mechanism 90 to the stroller position, the user forces the handle 92 (forwardly, in the embodiment shown) so that the handle arm linkage 100 pushes the lifting rod linkage 98 (and in particular the rod bridge 84) past top dead centre, as shown in FIG. 6C, causing the auxiliary wheels 62 to drop. The handle 92 continues to be forced by the user, toward and then past the position shown in FIG. 6D, until the longitudinal axis of the handle arm linkage 100 (represented by phantom line B in FIG. 6E) crosses the toggle centre line (represented by phantom line C in FIG. 6E), until the handle arm linkage 100 comes to rest on the lifting rod linkage 98, as best seen in FIG. 6E. In particular, the handle arm pivots 100a pass top dead centre, locking the auxiliary wheel actuating mechanism 90 in the stroller position. Preferably in the stroller position the rear wheel 32 of the bicycle 10 is suspended above the ground, as shown in FIG. 4, in which case in order to move the handle arm linkage 100 back past top dead centre the weight of the rear of the bicycle must be overcome. This retains the auxiliary wheel actuating mechanism 90 locked in the stroller position.

Figure 7A:
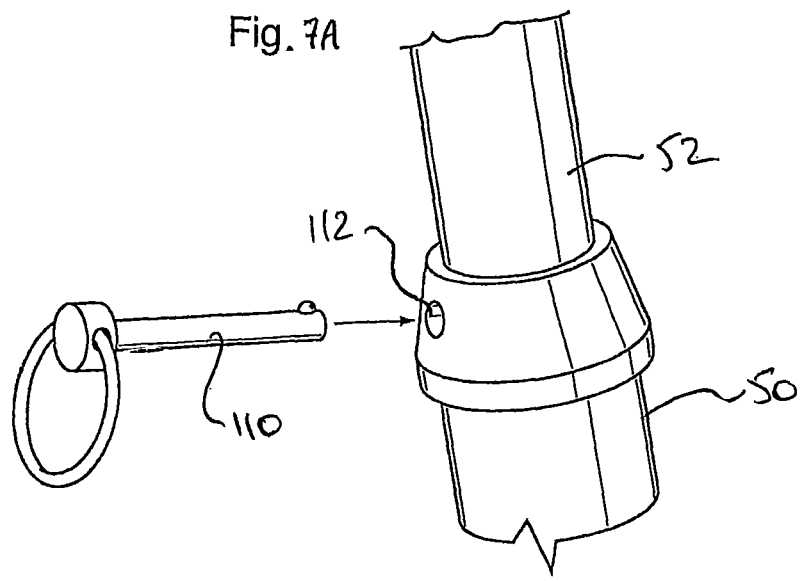
FIG. 7A is a partial perspective view of the bicycle head tube and handlebar stem showing a locking pin in position for insertion to rotationally lock the handlebars.
Figure 7B:
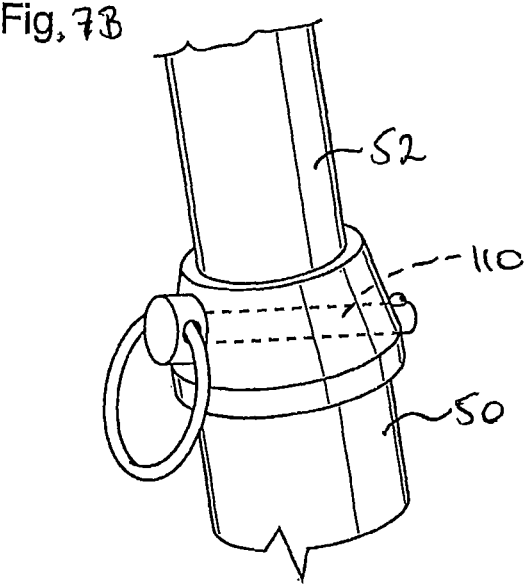
FIG. 7B is a perspective view of bicycle steering column showing the steering in the rotationally locked condition.

When in the stroller mode, the bicycle steering must be locked so that the bicycle moves in a straight line when being pushed. One means of achieving this is illustrated in FIGS. 7A and 7B. Opposed openings 112 are provided through any convenient portion of the head tube 50 and handlebar stem 52. A removable pin 110 can then be inserted as shown in FIG. 7B to rotationally lock the handlebar stem 52, and thus the handlebar 54, with the front wheel 34 directed straight forward. This can be achieved in many other ways, the example illustrated in FIGS. 7A and 7B being merely illustrative.

It may be advantageous to provide the top tube 22 of the frame 20 as an outer tube 22a fixed within the frame and a separate inner tube 22b slidably mounted in the outer tube 22a, which can be locked into a selected longitudinal position by tightening thumbscrews 23. This allows the handlebar and front wheel assembly to be retracted toward the rear wheel 32 when the bicycle is in the stroller mode, compressing the bicycle 10 along its length and making it easier to push and steer from behind in the stroller mode.

Figure 8:
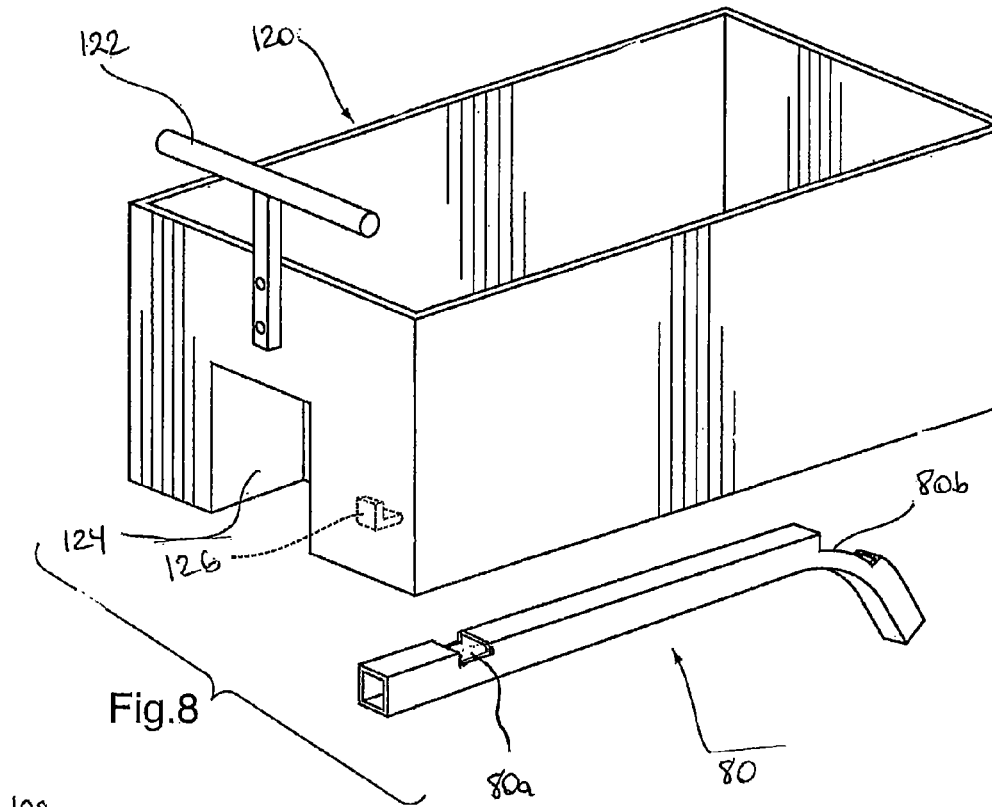
FIG. 8 is a perspective exploded view of an embodiment of a carrier for the convertible bicycle and a carrier mounting bar on the bicycle.

In the preferred embodiment a carrier 120, illustrated in FIG. 8, is provided for mounting on the frame 20, preferably on the wheel frame support 80. The carrier 120 may be permanently mounted, or can be removably mounted as illustrated, for use as desired in the stroller mode or in the bicycle mode. The carrier may be sized to accommodate a child safety seat (e.g. a car seat) for use in either the bicycle mode or the stroller mode, for example (without limitation) the ORBIT-BABY (trademark) G2 Infant Car Seat by Orbit Baby, Inc.).

Figure 9A:
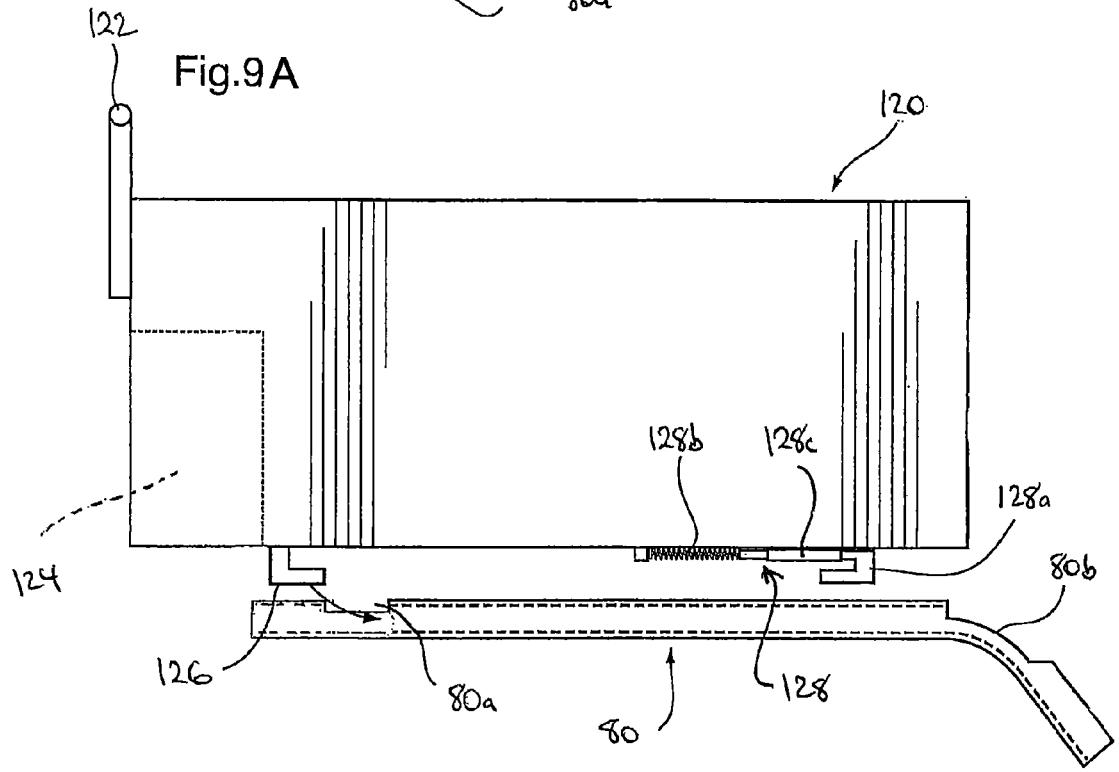

In the embodiment illustrated the carrier 120 is adapted for mounting on the wheel frame support 80, and optionally may be adapted to be mounted on the handlebar 54 when the bicycle 10 is in the bicycle mode. The carrier 120 provides a recess 124 so that the rear of the carrier 120 does not interfere with the auxiliary wheel actuating mechanism 90, and optionally a hand grip 122 which can be grasped by the user to push the bicycle 10 in the stroller mode. The wheel frame support 80 in the embodiment shown is formed from a square tube, and is thus hollow. A rear hook 126 is adapted for insertion into a slot 80a in the wheel frame support 80, and a front hook 128 is adapted for insertion into a slot 80b in the wheel frame support 80, as best seen in FIG. 9A. One of the hooks (the front hook 128 in the embodiment shown) is retractable, comprising a hook member 128a slidably mounted in a channel 128c and fixed to a screw 128b such that rotation to tighten the screw 128b retracts the hook member 128a into the channel 128c. The carrier 120 can thus be positioned as shown in FIG. 9B, with the rear hook 126 engaged over the front edge of the slot 80a and with the front hook member 128a projecting into the slot 80b. Tightening the screw 128b engages the hook member 128a over the rear edge of the slot 80b, as shown in FIG. 9C, to secure the carrier 120 on the bicycle 10.

The present invention having been described in detail by way of example, it will be apparent to those skilled in the art that variations and modifications may be made without departing from the invention. For example, although the three-wheeled mode of the invention has been described as a stroller, there are many other uses for the three-wheeled embodiment, as a carrier for parcels or goods, a stable training bicycle, a jogger and other such uses. The invention includes all such applications, variations and modifications as fall within the scope of the claims.

The invention claimed is:

1. A bicycle convertible to a three-wheeled vehicle, comprising
   a front wheel and a rear wheel,
   a frame mounted on the front and rear wheels, the front wheel being rotationally mounted to the frame so as to be selectively rotatable to steer the bicycle in a bicycle mode or locked in a rotationally fixed position in a stroller mode,
   a drive for propelling the bicycle in a forward direction in the bicycle mode,
   a pair of auxiliary wheels, one auxiliary wheel being mounted to the frame on each side of the bicycle and movable between a raised position in which the auxiliary wheels are raised from the ground when the bicycle is in the bicycle mode and a lowered position in which the auxiliary wheels contact the ground when the bicycle is in the stroller mode, and
   a lock for locking the auxiliary wheels in the respective raised and lowered positions, the lock comprising a double-locking over-center toggle bar linkage comprising a handle having a first position on one side of a toggle center and a second position on an opposite side of the toggle center, the handle being:
      movable to raise the auxiliary wheels from the lowered position to a maximum height at the toggle center and past the toggle center to lower the auxiliary wheels to the first position, wherein the auxiliary wheels are locked in the raised position, and
      movable to raise the auxiliary wheels from the raised position to the maximum height at the toggle center and past the toggle center to lower the auxiliary wheels to the second position, wherein the auxiliary wheels are locked in the lowered position.

2. The bicycle of claim 1 comprising a carrier for attachment to the bicycle.

3. The bicycle of claim 2 wherein the carrier is adapted to be removably affixed to the frame.

4. The bicycle of claim 3 wherein the carrier is adapted to be removably affixed to a handlebar.

5. The bicycle of claim 1 wherein the frame is retractable such that the front wheel can be selectively compressed toward the rear wheel.

6. The bicycle of claim 1 wherein the front wheel of the bicycle is locked in a rotationally fixed position by a pin extending through a head tube of the frame and a handlebar stem rotationally retained within the head tube.

7. The bicycle of claim 1 wherein when the auxiliary wheels are locked in the lowered position the rear wheel of the bicycle is raised from a supporting surface.

8. The bicycle of claim 1 wherein the auxiliary wheels are each supported by a wheel support arm comprising pairs of upper and lower bridging bars each pivotally secured at one end to a wheel support bar affixed to the frame and at the other end to an axle of the auxiliary wheel, such that the auxiliary wheels remain generally parallel to one another in both the bicycle and stroller modes.

9. The bicycle of claim 1 wherein the frame includes a retractable portion, wherein the retractable portion is configured to enable the front wheel to be retracted toward the rear wheel when the bicycle is changed from the bicycle mode to the stroller mode.

10. The bicycle of claim 1 wherein when the bicycle is in the stroller position the handle is accessible for gripping by a user pushing the stroller.

11. A bicycle convertible to a three-wheeled vehicle, comprising
a front wheel and a rear wheel, wherein the front and rear wheels are configured to roll in contact with a supporting surface,
a frame, wherein the frame is mounted in operatively supported connection with the front and rear wheels, wherein the front wheel being rotationally mounted in operative connection with the frame so as to be selectively rotatable generally transversely of the ground surface, to steer the bicycle in a bicycle mode,
a steering lock, wherein the steering lock is configured to selectively lock the front wheel in a rotationally fixed steering position, wherein the bicycle is convertible to a stroller mode,
a drive, wherein the drive is usable to propel the bicycle in a forward direction in the bicycle mode,
a pair of auxiliary wheels, wherein one auxiliary wheel is movably mounted in operating supported connection with the frame on each horizontal side of the bicycle, and wherein each of the auxiliary wheels is configured to be movable between a raised position in which the auxiliary wheels are raised above the supporting surface when the bicycle is in the bicycle mode and a lowered position in which the auxiliary wheels contact the supporting surface when the bicycle is in the stroller mode, and
a lock, wherein the lock is configured to selectively hold the auxiliary wheels in respective raised and lowered positions, wherein the lock comprises:
a double-locking over-center toggle bar linkage,
a handle, wherein the handle is in operation with the linkage, wherein the handle is selectively moveable between a first position wherein the auxiliary wheels are held in the raised position, and a second position wherein the auxiliary wheels are held in the lowered position, wherein the handle is movable to raise the auxiliary wheels from the lowered position to a maximum height at the toggle center and past the toggle center to lower the auxiliary wheels to the first position, wherein the auxiliary wheels are locked in the raised position, wherein the handle is movable to raise the auxiliary wheels from the raised position to the maximum height at the toggle center and past the toggle center to lower the auxiliary wheels to the second position, wherein the auxiliary wheels are locked in the lowered position.

12. The bicycle of claim 11 wherein when the auxiliary wheels are held in the lowered position, the rear wheel of the bicycle is raised above the supporting surface.

13. The bicycle of claim 11 wherein the frame includes a retractable portion wherein the retractable portion is configured to selectively enable the front wheel to be moved toward the rear wheel.

14. The bicycle of claim 11, wherein the steering lock includes a pin configured to be extendable through a head tube of the frame and a handlebar stem rotationally retained within the head tube.

15. The bicycle of claim 11, wherein when the bicycle is in the stroller mode the handle is configured to be gripped and used by a user to push the bicycle.

16. A bicycle convertible to a three-wheeled vehicle, comprising
a front wheel and a rear wheel, wherein the front and rear wheels are configured to roll in contact with a supporting surface,
a frame, wherein the frame is mounted in operatively supported connection with the front and rear wheels, wherein the front wheel being rotationally mounted in operative connection with the frame so as to be selectively rotatable generally transversely of the ground surface, to steer the bicycle in a bicycle mode,
a steering lock, wherein the steering lock is configured to selectively lock the front wheel in a rotationally fixed steering position, wherein the bicycle is convertible to a stroller mode,
a drive, wherein the drive is usable to propel the bicycle in a forward direction in the bicycle mode,
a pair of auxiliary wheels, wherein one auxiliary wheel is movably mounted in operating supported connection with the frame on each horizontal side of the bicycle, and wherein each of the auxiliary wheels is configured to be movable between a raised position in which the auxiliary wheels are raised above the supporting surface when the bicycle is in the bicycle mode and a lowered position in which the auxiliary wheels contact the supporting surface when the bicycle is in the stroller mode, and
a lock, wherein the lock is configured to selectively hold the auxiliary wheels in respective raised and lowered positions, wherein the lock comprises:
a double-locking over-center toggle bar linkage,
a handle, wherein the handle is in operation with the linkage, wherein the handle is selectively moveable between a first position wherein the auxiliary wheels are held in the raised position, and a second position wherein the auxiliary wheels are held in the lowered position,
wherein the auxiliary wheels are each supported by a wheel support arm, wherein the wheel support arm includes pairs of upper and lower bridging bars each pivotally secured at one end to a wheel support bar affixed to the frame and at the other end to an axle of the auxiliary wheel, such that the auxiliary wheels remain generally parallel to one another in both the bicycle and stroller modes.

17. The bicycle of claim 16 wherein the frame includes a retractable portion wherein the retractable portion is configured to selectively enable the front wheel to be moved toward the rear wheel.

18. The bicycle of claim 16, wherein the steering lock includes a pin configured to be extendable through a head tube of the frame and a handlebar stem rotationally retained within the head tube.

19. The bicycle of claim 16 and further including a carrier, wherein the carrier is configured to be removably affixed to a handlebar of the bicycle.

20. The bicycle of claim 16 wherein when the auxiliary wheels are held in the lowered position, the rear wheel of the bicycle is raised above the supporting surface.

* * * * *